United States Patent
Freeman et al.

[11] Patent Number: 6,068,183
[45] Date of Patent: May 30, 2000

[54] CHIP CARD SYSTEM

[75] Inventors: David H. Freeman, Tampa, Fla.; Gary A. Freeman, Newton, Mass.

[73] Assignee: Viztec Inc., Tampa, Fla.

[21] Appl. No.: 09/061,879

[22] Filed: Apr. 17, 1998

[51] Int. Cl.[7] .................................................. G06K 5/00
[52] U.S. Cl. ........................... 235/375; 235/492; 705/26
[58] Field of Search .................................. 235/375, 492; 705/7, 26

[56] References Cited

U.S. PATENT DOCUMENTS

| | | | |
|---|---|---|---|
| D. 305,023 | 12/1989 | Suto | D14/117 |
| 4,380,699 | 4/1983 | Monnier et al. | 235/492 |
| 4,704,003 | 11/1987 | Komaki et al. | 350/344 |
| 4,746,787 | 5/1988 | Suto et al. | 235/379 |
| 4,954,985 | 9/1990 | Yamazaki et al. | 365/108 |
| 5,055,968 | 10/1991 | Nishi et al. | 361/395 |
| 5,142,510 | 8/1992 | Rodda | 367/163 |
| 5,295,064 | 3/1994 | Malec et al. | 395/201 |
| 5,315,377 | 5/1994 | Isono et al. | 348/51 |
| 5,359,183 | 10/1994 | Skodlar | 235/493 |
| 5,477,038 | 12/1995 | Levine et al. | 235/380 |
| 5,517,011 | 5/1996 | Vandenengel | 235/441 |
| 5,594,493 | 1/1997 | Nemirofsky | 348/13 |
| 5,625,477 | 4/1997 | Wu et al. | 349/35 |
| 5,636,044 | 6/1997 | Yuan et al. | 349/142 |
| 5,638,194 | 6/1997 | Yamada et al. | 349/86 |
| 5,682,294 | 10/1997 | Horejs, Jr. et al. | 361/737 |
| 5,693,956 | 12/1997 | Shi et al. | 257/40 |
| 5,703,755 | 12/1997 | Flesher et al. | 361/737 |
| 5,724,424 | 3/1998 | Gifford | 380/24 |
| 5,727,153 | 3/1998 | Powell | 395/214 |
| 5,734,154 | 3/1998 | Jachimowicz et al. | 235/492 |
| 5,770,849 | 6/1998 | Novis et al. | 235/492 |
| 5,777,903 | 7/1998 | Piosenka et al. | 364/700 |
| 5,804,803 | 9/1998 | Cragun et al. | 235/375 |
| 5,822,737 | 10/1998 | Ogram | 705/26 |
| 5,880,769 | 3/1999 | Nemirofsky et al. | 348/12 |
| 5,884,271 | 3/1999 | Pitroda | 705/1 |

OTHER PUBLICATIONS

Doane et al., "Reflective Cholesteric Liquid–Crystal Displays," *Information Display* (Dec. 1996).

Merkert, "The Scoop on Chips," *Moneycard Collector*, (Jan. 27, 1998).

Yaniv, "Reflective Cholesteric Displays," *Information Display* (Oct. 1995).

Yuan, "Bistable Reflective Cholesteric Displays," (article—no publication name).

"Polymer–dispersed LCDs," printed from Internet on Sep. 17, 1997, http://stefan.www.media.mit.edu/people/stefan/liquid–crystals/node9.html.

"Ferroelectric LCDs," printed from Internet on Sep. 14, 1997, Published: Jun. 1992, HTML: Aug. 30, 1995, file:///C/My Documents/Gary/smart card/ferro_1.htm.

"A contactless multiservice system—Technology transfer," Innovation Industries/Roland Moreno Technology, product new release, Paris, France, 3 pages, 1997.

*Primary Examiner*—Donald Hajec
*Assistant Examiner*—Mark Tremblay
*Attorney, Agent, or Firm*—Fish & Richardson P.C.

[57] ABSTRACT

A method of delivering advertisement information from a source of advertisement information to a chip card for display on a display element of the chip card. The method includes establishing a communication path between the source and the chip card, transmitting the advertisement information from the source to the chip card via the communication path; and, displaying the transmitted advertisement information on the chip card display element. Also featured is a method of electronic ticketing that transmits ticketing information to chip card memory, and displays the ticketing information on the chip card display element.

20 Claims, 9 Drawing Sheets

CHIP CARD SYSTEM

REFERENCE TO RELATED APPLICATIONS

This relates to U.S. patent application Ser. No. 09/040,517, filed on Mar. 17, 1998, which is incorporated by reference.

BACKGROUND OF THE INVENTION

The present invention relates to data or transaction cards containing semiconductor processors and/or memory chips.

Such cards are commonly referred to as chip cards (or smart cards). They are typically wallet-size and contain a microchip. Often, there are electrical contacts on the surface of the card through which communications are made between an external chip card device and the semiconductor chip, but there are also wireless chip cards in which communication is made using a wireless transceiver located within the card.

One of the widespread uses of chip cards today is as a stored-value card which contains monetary value in the microchip embedded in the card. For example, each time a consumer uses a chip card in a vending machine, the amount of the purchase is deducted from the cash balance stored in the microchip on the card. One application for such stored-value cards is eliminating the need for people to carry around small coins or bills and speeding up the time it takes to consummate small cash transactions.

Chip card systems divide broadly into open or closed systems. Closed systems limit chip card usage to particular chip card readers. For example, a long-distance carrier may offer chip cards that only operate their long-distance equipment. Open systems (e.g., VisaCash) operate on a wider variety of chip card readers.

Often chip cards include advertisements permanently printed on their body. For example, a long distance calling card may feature a printed image of the long distance carrier's trademark.

SUMMARY OF THE INVENTION

In general, in one aspect, the invention features a method of delivering advertisement information from a source of advertisement information to a chip card for display on a display element (e.g., a flexible, color display element) of the chip card. The method includes establishing a communication path between the source and the chip card, transmitting the advertisement information from the source to the chip card via the communication path, and displaying the transmitted advertisement information on the chip card display element.

Embodiments may include one or more of the following features. The advertisement information may include a graphic image or an image sequence. The chip card may store advertisement information for one or more advertisements in chip card memory. The advertisement information displayed on the chip card may be selected from the stored advertisements. The advertisement information may represent, for example, an image of a coupon or an image of a store map. The chip card may also receive audio information or internet addresses.

The chip card may receive selected advertisement information. Such information may be selected based on information retrieved from the chip card, such as a chip card identification code, chip card usage data, demographic data, or sound data.

The communication path may include networked computers. Any point in the communication path may block transmission of the advertisement information.

In general, in another embodiment, the invention features a method of electronic ticketing using a chip card having memory and a display element. The method includes transmitting ticketing information to chip card memory, and displaying the ticketing information on the chip card display element. The method may further include retrieving data from the chip card to authorize admission.

The invention has numerous advantages. It offers consumers the ability to receive advertisements, coupons, and other information likely to prove of interest to the consumer. Additionally, paperless transmission of information can speed different transactions and reduce paperwork.

The invention also enables businesses to target advertising and other information for transmission to customers by analyzing detailed consumer profiles built from demographic and transaction information. The information sent to the chip card is presented to the consumer whenever the consumer uses the chip card. Further, businesses can both send information and collect consumer profile data from the multitude of environments that process chip cards (e.g., telephones, screen phones, computers, ATM machines, parking meters, vending machines, stadium ticket facilities, GSM devices, gas pumps, copy machines, laundromats, theaters, casino gaming machines, etc.). Additionally, businesses can track the success of their consumer targeting efforts. For example, a business may record when an electronic coupon was sent to a consumer and if and when the consumer redeemed the coupon.

The invention also enables consumers to receive ticketing information that can admit them to a venue, guide them to their seats, and even provide coupons for venue concessions.

Other features and advantages of the invention will be apparent from the following description of preferred embodiments and from the claims.

DESCRIPTION OF THE PREFERRED EMBODIMENTS

Figure 1A:
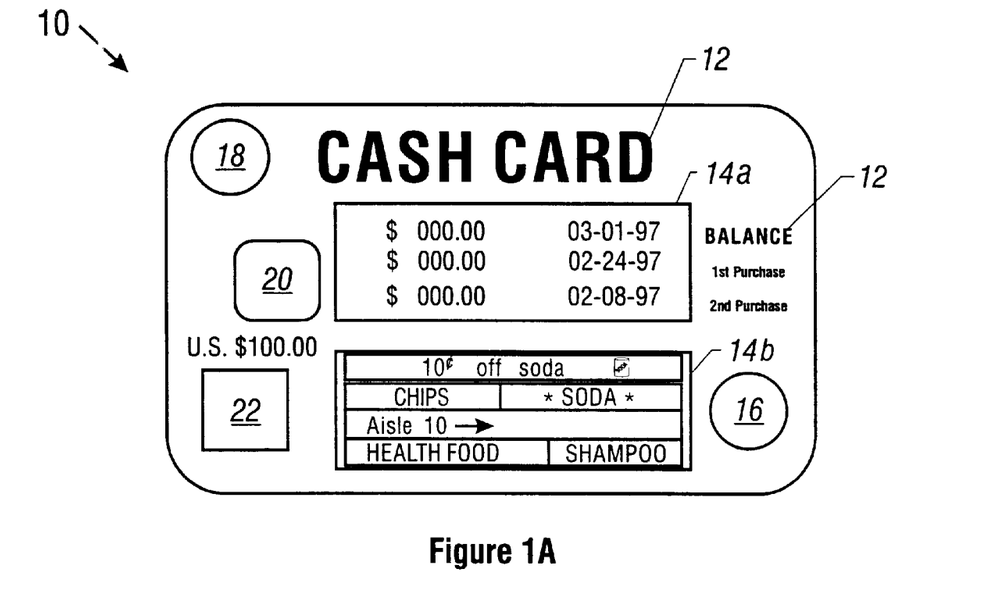
FIG. 1A–1C are diagrams illustrating chip card features.
Figure 1B:
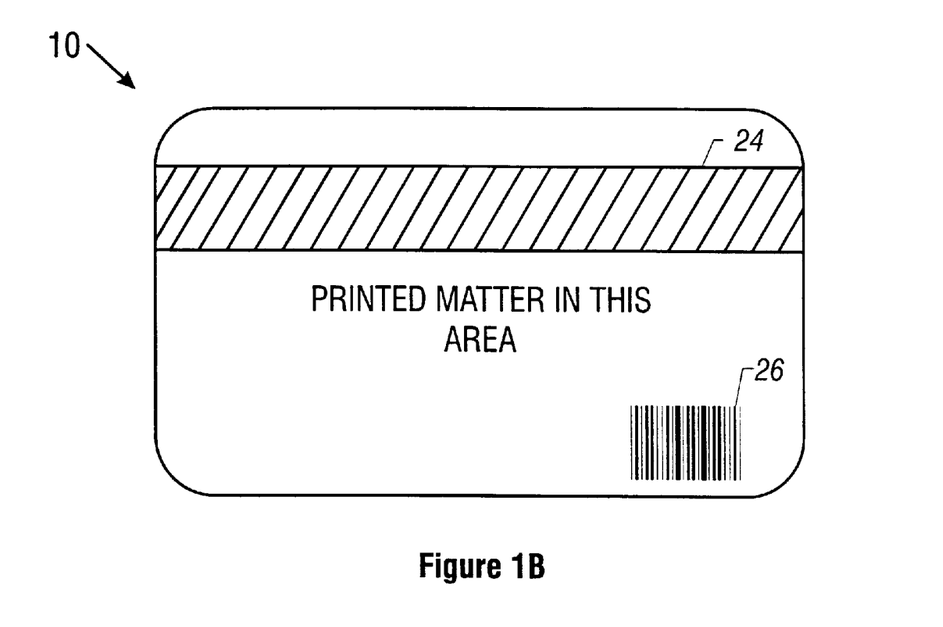

Turning to FIG. 1A, there is shown a chip card 10 having a transparent protective top layer (PVC or other clear plastic) and transparent (or opaque or translucent) substrate (PVC or other plastic). The top layer and substrate (body) may be molded or machined into the necessary shape to accommodate the internal components of the card. Indicia 12 may be printed on the top layer (e.g., on the interior surface). A conventional magnetic stripe 24 and signature panel can be provided on the bottom of the card (FIG. 1B).

The chip card includes an integrated circuit 16 mounted beneath a printed circuit board, which fits within a cutout in the card body. Contacts 20 may appear on the surface of the printed circuit board to provide electrical connection to the card. As mentioned, some chip cards offer wireless communication, thereby eliminating the need for contacts.

Display elements 14a–14b are provided on the top surface of the card. The display elements 14a–14b preferably include multi-color ferroelectric LCD displays that offer flexibility and do not require a power source to display an image. However, other cards may offer other types of display elements (e.g., suspended particle displays or field emission displays). The chip card 10 shown includes two display elements 14a–14b. Such a configuration permits an orchestrated chip card 10 display where one display element 14a displays a stored value (e.g., a seat number), while the other 14b displays other graphic information (e.g., a theater seat map or directions to the theater). A chip card 10 may instead offer a single display element (not shown) that nearly covers an entire side of the chip card 10. As shown, display element 14b features graphics of an electronic coupon for a product and a map indicating the location of the product within a store. A store chip card reader at a checkout line can redeem the electronic coupon after verifying purchase of the product (e.g., by comparing a Universal Product Code (UPC) stored in the card with a UPC code identified by a bar code scanner).

A display element 14a or 14b can include a barrier strip (not shown) that offers stereoscopic effects such as images that appear three-dimensional and images that alter their appearance based on viewing angle (e.g., a face that winks as a viewer moves the card). The chip card may also feature a speaker or microphone. For example, a flexible thin-film piezoelectric speaker/microphone offers several octaves of sound yet requires little room. The speaker/microphone can both store and retrieve sound information from chip card memory.

Figure 2:
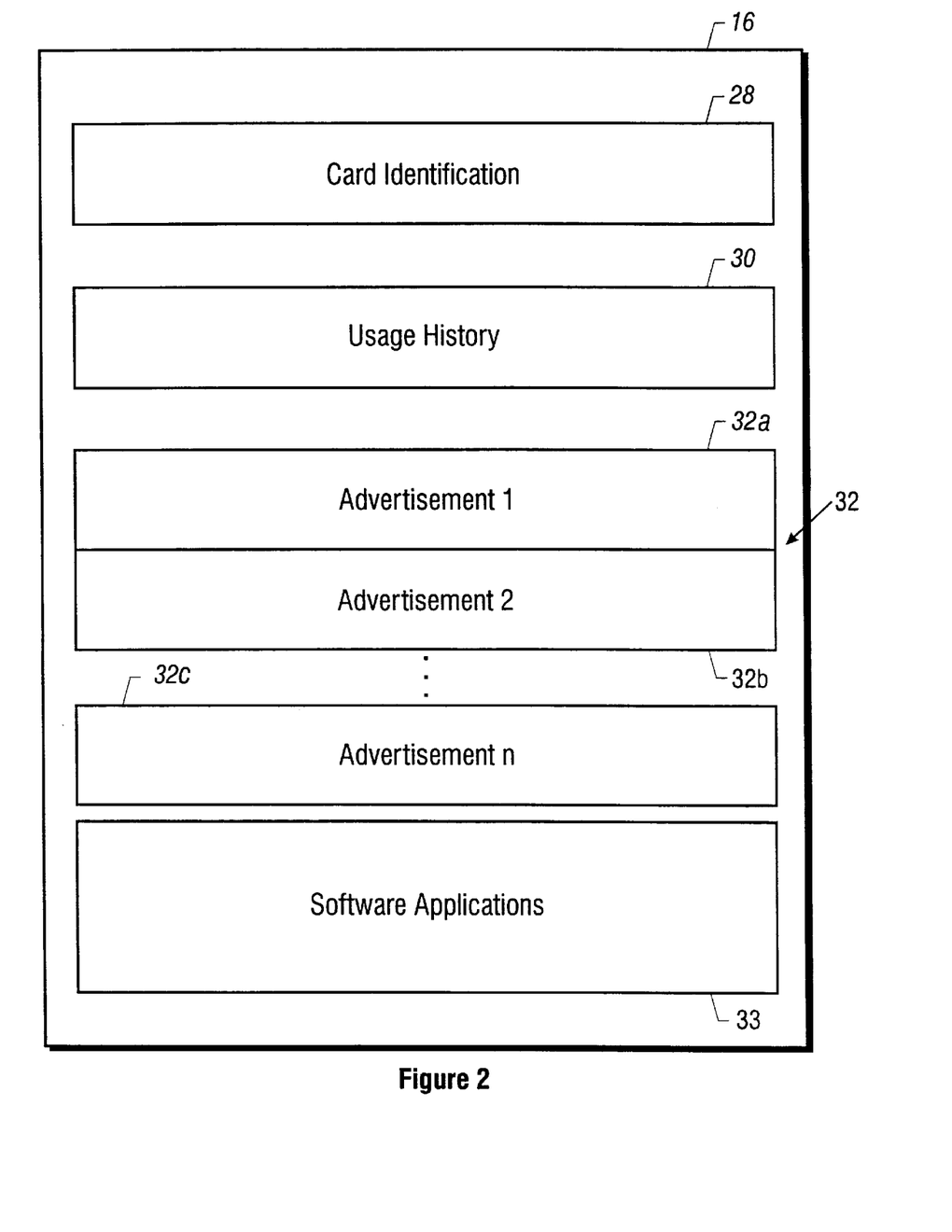
FIG. 2 is a diagram of information stored in chip card memory.

The integrated circuit 16 includes a microprocessor for storing and processing information, and circuitry for powering and controlling the display element and speaker. The microprocessor can support multiple applications (FIG. 2). Such applications may include compression/decompression applications that reduce the amount of information exchanged between the card and a card reader.

Figure 1C:
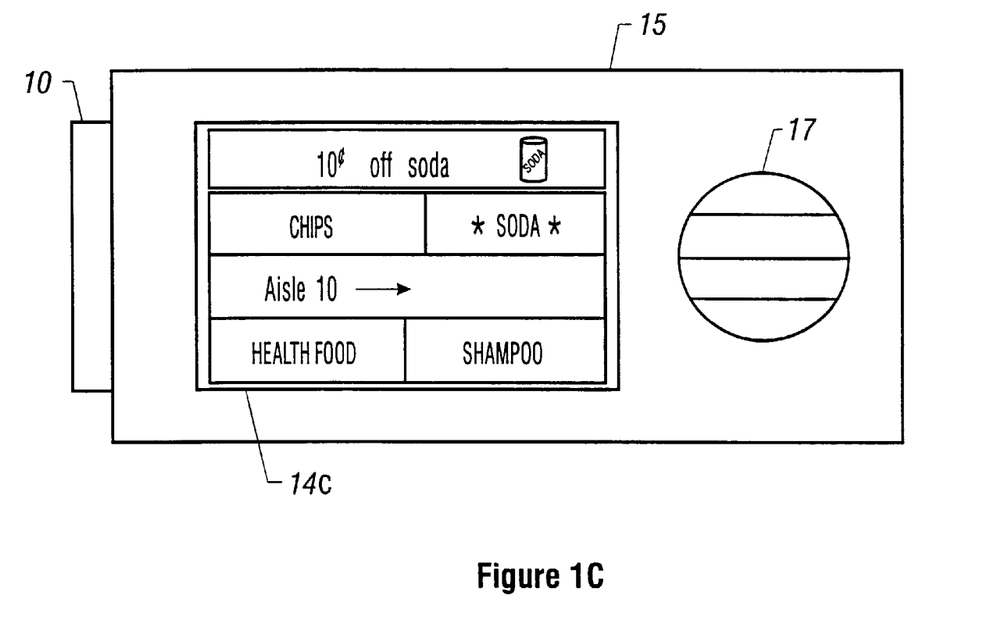

Referring to FIG. 1C, the chip card, instead of providing its own display element, speaker, etc., may fit within a portable chip card reader 15 that offers a display element 14c and/or speaker 17. The chip card may send graphic image and sound information to the portable chip card reader 15 for presentation.

Referring to FIG. 2, information stored in the integrated circuit 16 includes card identification 28, usage history information 30, audiovisual information 32, and applications 33. Card identification 28 information may include a card serial number and potentially demographic or biographic data describing the card owner (e.g., age, gender, etc.). Usage history 30 may include data describing prior uses of the card such as the location, time, and nature of such uses (e.g., March 17 12:00 $1.00/vending machine/Main Street).

Audiovisual information 32 may include graphic information, sound information, or both. Graphic information can use a variety of data formats including JPEG and GIF. Audiovisual information 32 may also include text. Further, image information may be a sequence of images that provide image animation. Both a chip card with a display and a portable chip card reader can access and present the audiovisual information 32. The information 32 may form advertisements (e.g., product descriptions, electronic coupons, etc.), maps, or other helpful information. The information 32 may further include network addresses. Storing network addresses enables a chip card owner to insert a chip card 10 into a chip card reader connected to a computer and visit a website for more information related to the information presented on the chip card. Information 32 may also include a time stamp indicating when the card received the information 32.

The card may store information 32a–32n for several different presentations of audiovisual information. The integrated circuit 16 may rotate the information 32a–32n the chip card features (i.e., displays or plays on the speaker) at fixed intervals or based on events (e.g., usage). Alternately, a card owner may manipulate card controls to replay stored audiovisual presentations, for example, to retrieve an electronic coupon, reread map directions, or reexamine a company's advertisement. The ability to replay presentations can foster competition among producers to make presentations consumers repeatedly view.

Figure 3:
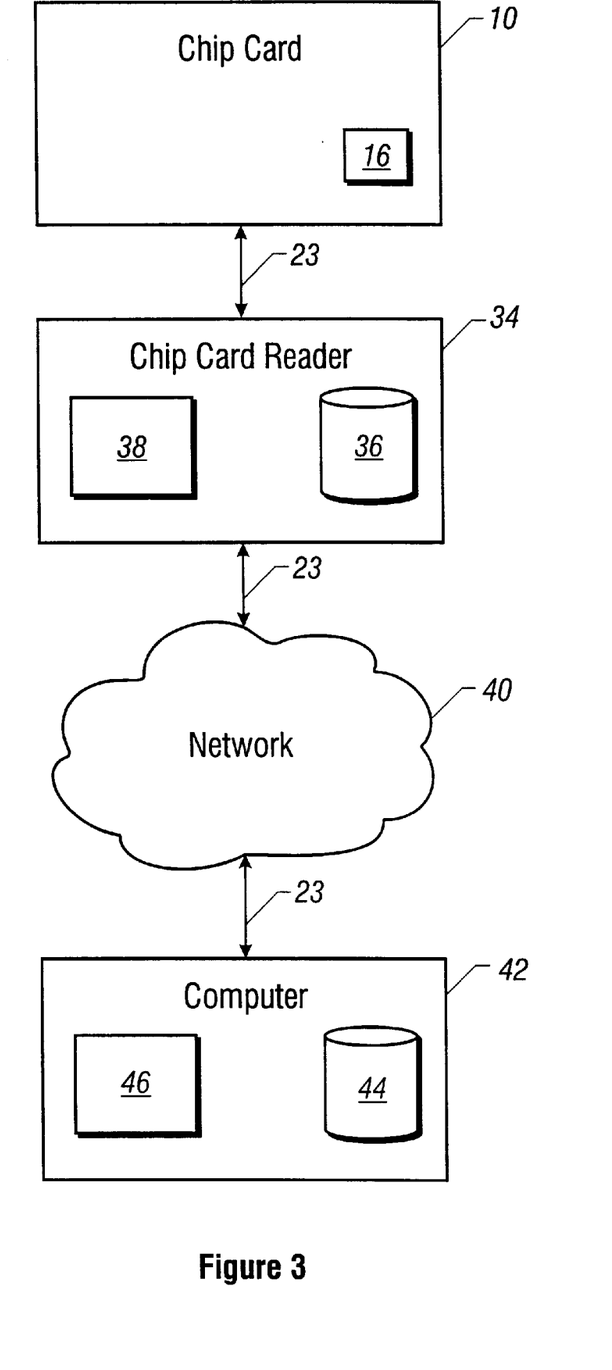
FIG. 3 is a diagram of a chip card, a chip card reader, and connected equipment.

Referring to FIG. 3, a chip card reader 34 can download audiovisual information to the chip card 10 via a communication path 23 that includes chip card contacts or wireless communication. Downloading may occur during other chip card reader 34 uses (e.g., during a chip card paid phone call). The chip card reader 34 may be a stand-alone chip card reader, a computer peripheral, or a portable chip card reader. The chip card reader 34 may include software 38 and a database of audiovisual information 36. The chip card reader 34 not only sends information to the chip card 10, but may also store data describing the chip card transaction including which information the chip card reader 34 downloaded to the chip card 10. Subsequent analysis of collected information can enable businesses to track the effectiveness of their advertising efforts. The software 38 may select information for one or more presentations from the database 36 for transmission to the chip card.

In a batch system, information describing chip card transactions may be periodically transferred to a host computer for analysis and storage. Such transfer may occur over a temporary modem connection or a visit by a service person. At the same time, new presentations or software 38 may be uploaded to the chip card reader 34.

Preferably, the chip card reader 34 connects to a host computer 42 via a network 40. In a network configuration, the host computer 42 may include software 46 that accesses a database of advertisement information 44. Potentially, the host computer 44 stores a more extensive database of advertisement information and offers more sophisticated analysis software 46.

Figure 4A:
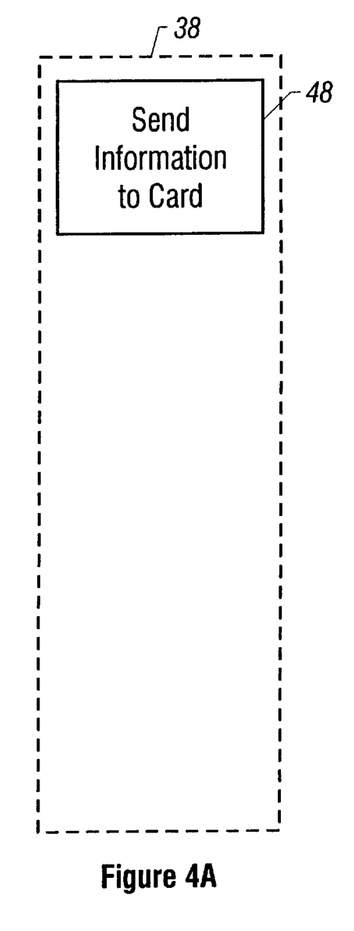
FIG. 4A–4D are flowcharts of information delivery.

Referring to FIGS. 4A–4D, a chip card reader may transmit audiovisual information to a chip card with varying degrees of sophistication. As shown in FIG. 4A, a chip card reader may simply send (48) the same audiovisual information to each chip card the reader encounters. For example, a store may transmit the same graphic image of an electronic coupon to each wireless chip card that passes through a store entrance. The image may include a map indicating the location of the product. The audiovisual information may further include signals that cause the chip card to generate a sound alerting an owner entering a store of a new chip card presentation.

Figure 4B:
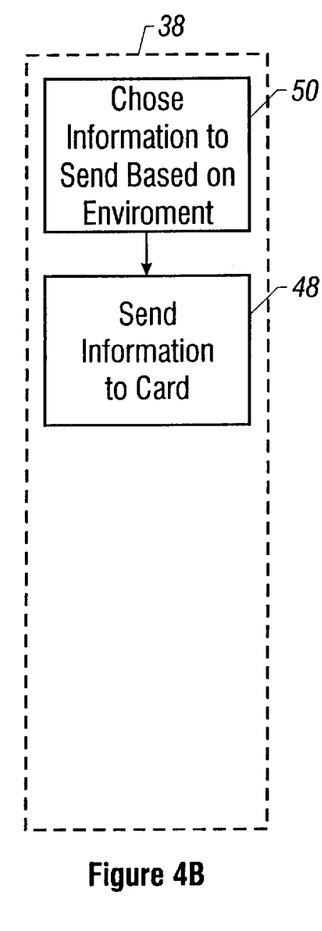

FIG. 4B shows a slightly more sophisticated method of transmitting audiovisual information. In FIG. 4B, the chip card reader selects audiovisual information for transmission based on factors (50) such as the time, amount, or type of transaction. For example, someone purchasing cereal in the morning may find a chip card coupon for milk very useful.

Figure 4C:
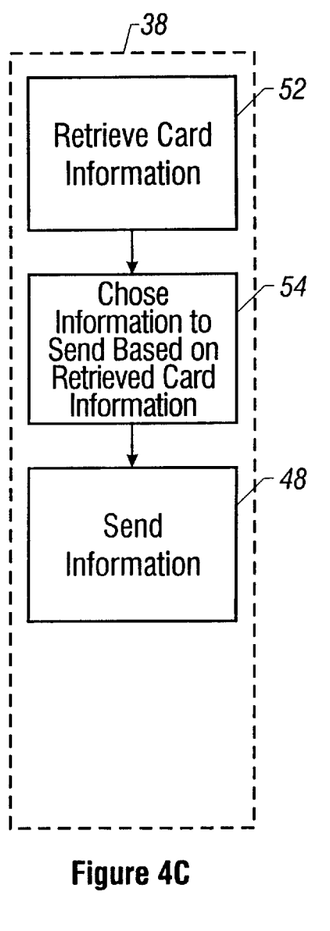

FIG. 4C shows a method of transmitting audiovisual information with even greater sensitivity to a particular customer. In FIG. 4C, the chip card reader retrieves information (52) from the chip card. The chip card reader can use this retrieved information (e.g., demographic data, usage history, or card serial number) to select appropriate audiovisual information for delivery. For example, if the card chip reader determines, either by retrieving usage history information from the card or using a retrieved card serial number to find such information in its own database, that a customer buys ice cream weekly, the chip card reader 34 may send an ice cream coupon to the chip card 10.

Figure 4D:
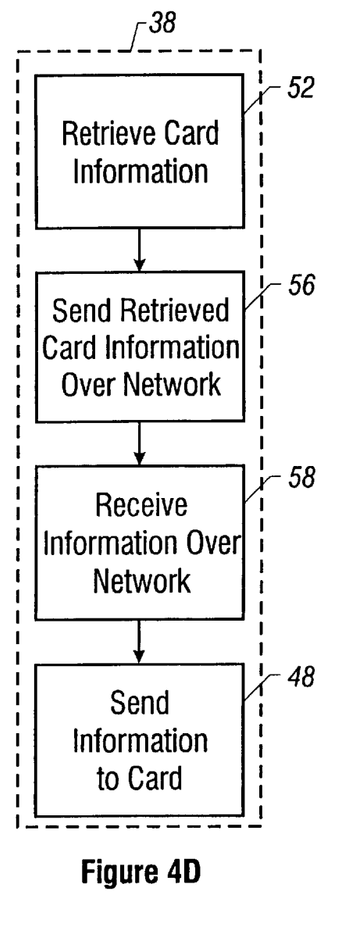

FIG. 4D shows a delivery method similar to that of FIG. 4C with the addition of a networked computer that may store audiovisual information and selection software in addition to or in lieu of storing these elements in the chip card reader. A networked computer can both control the audiovisual information dispensed by different card readers and efficiently collect chip card usage data.

The chip card reader may send retrieved chip card information over the network (56) for processing and receive audiovisual information from the networked computer (58). Many permutations of this configuration are possible, both in the arrangement of the elements and in the information exchanged. For example, rather than sending audiovisual information for each transaction, a computer may periodically download audiovisual information to chip card readers en masse, then merely transmit audiovisual information indices to the chip card reader, reducing the amount of information transmitted over the network.

Figure 5A:
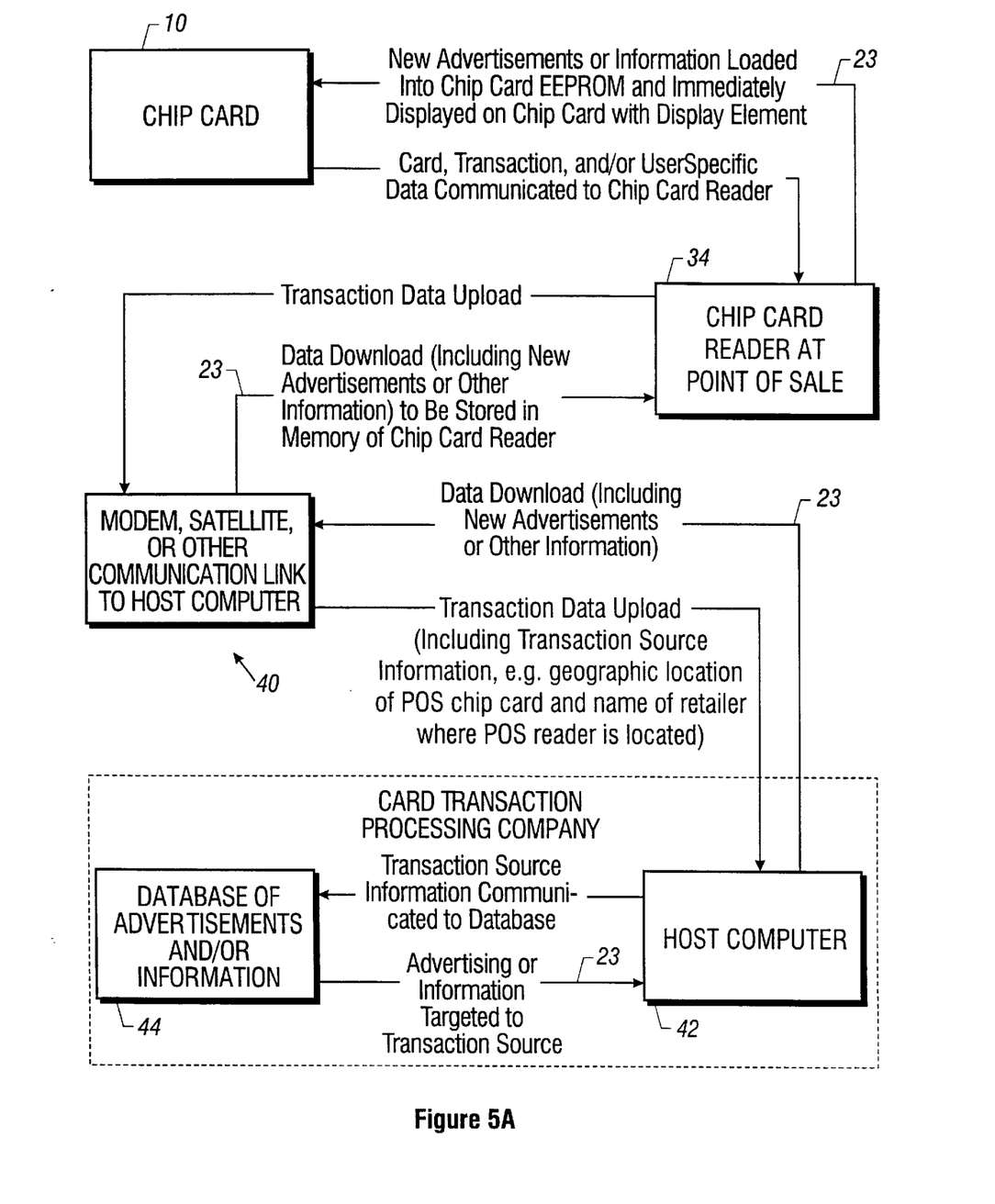
FIG. 5A and 5B are diagrams of embodiments of an information delivery system.
Figure 5B:
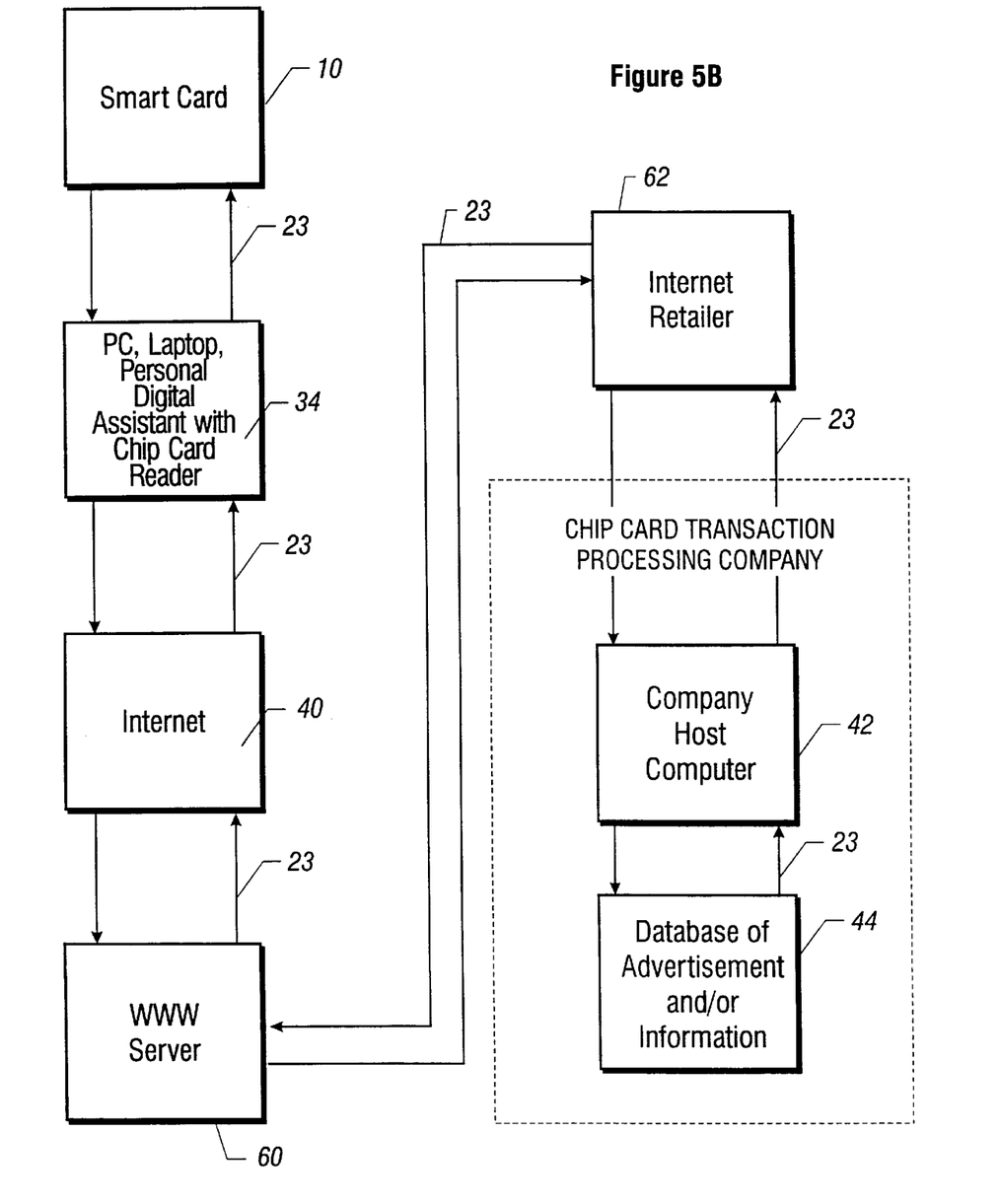

FIGS. 5A and 5B illustrate different embodiments that deliver audiovisual information to chip card readers. In FIG. 5A, a chip card reader 34 connects to a host computer 42 ia a communication path 23 than includes a communication link 40. In FIG. 5B, a chip card reader 34 attached to a computer connects to a host computer 42 via a communication path 23 that includes the internet 40.

Figures 6A, 6B:
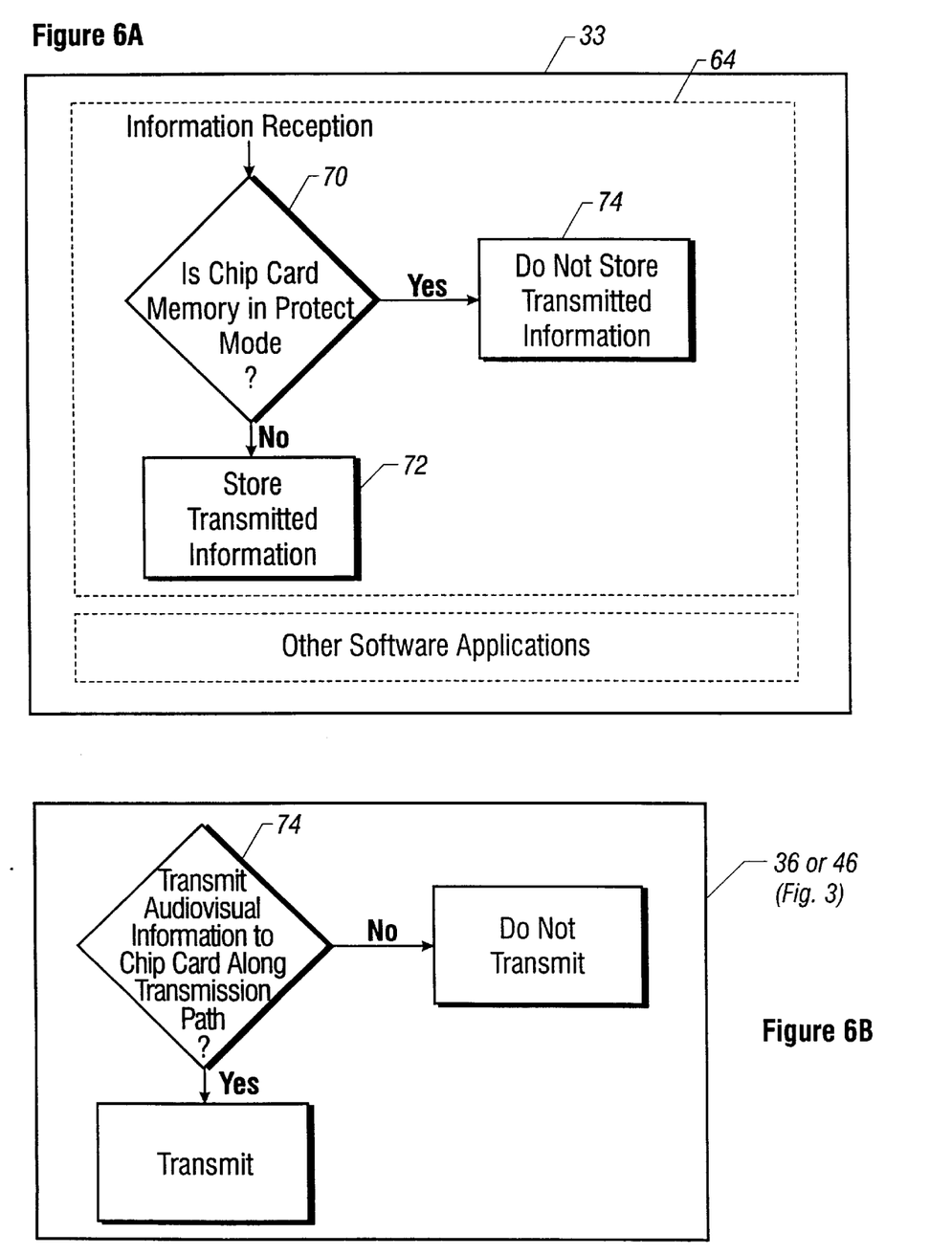
FIG. 6A and 6B are flowcharts of information blocking.

Referring now to FIG. 6A, software 64 (or firmware or hardware) within the chip card may block unwanted information transmission by putting the chip card in protect mode. In protect mode, the card does not store audiovisual information transmitted (74). This prevents a chip card from storing unwanted information that may potentially overwrite information of interest. The protect mode may apply to chip card memory as a whole or to individual presentations.

Figure 7:
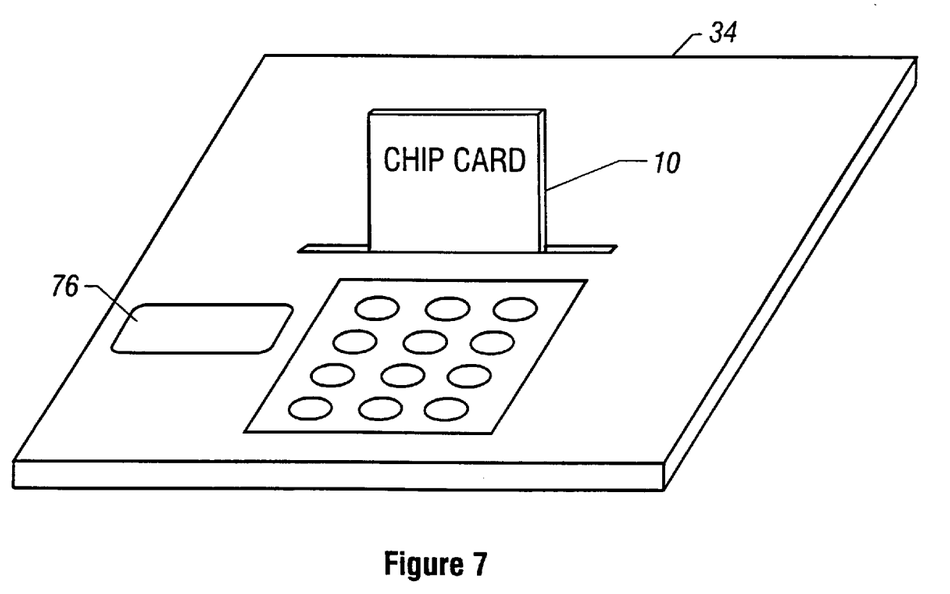
FIG. 7 is a diagram of an apparatus for blocking information.

Referring now to FIG. 6B, other points in the transmission path may block information transmission (76). For example, the host computer may recognize the card serial number as belonging to a card owner uninterested in receiving advertisements. Referring now to FIG. 7, the card owner may interact with a chip card reader that features a "do not download information" button 76 that prevents transmission of information from the chip card reader to the chip card. Again, many permutations of the above are possible.

A variety of applications can make effective use of the above described techniques. For example, a stadium chip card system can quickly download electronic tickets for single or multiple events to a chip card along with seat and stadium location information. The ticket information can appear on the chip card display. This can occur at purchase time over a network, reducing box-office lines. Admission into the stadium by chip card would present an opportunity to download stadium specific information to each chip card such as the location of facilities or coupons for concession refreshments (e.g., cotton candy for a circus or hot-dogs for a ball game). Of course, the stadium could generate revenue by downloading an outside business' information for a fee.

The display element may include transparent electrodes (indium tin oxide or other substantially clear conductive material) deposited on the interior surfaces of layers of the card. The electrodes may be configured to provide either a dot matrix pattern or a segmented display pattern. A Z-axis conductor (known polymeric material with conductivity only in the Z axis) provides conductive paths from the printed circuit board to the transparent electrodes on one layer. Contact with the electrodes on another layer is via connections through a Z-axis conductor between the layers (i.e., one layer acts as a pass through for connections to the other layer, rather than having the printed circuit board be connected to both layers, thereby simplifying construction).

The electrodes work in conjunction with liquid crystal display (LCD) film, which is a bi-stable or multi-stable display material that will maintain an image when power has been removed. In this way, it is unnecessary for the chip card to have its own power source, or be connected to a power source, for the display to function. The preferred LCD material is a ferroelectric LCD. These LCDs are based on smectic liquid crystals typically of the smectic C phase with chiral behavior. When formed in a thin layer the ferroelectric material has a net polarization that is perpendicular to the viewing surface. The electrodes apply a field that rotates polarization between an "on" and an "off" state. Ferroelectric LCDs are typically sensitive to shock or bending, making them unsuitable for use in a chip card that can be bent (e.g., when stored in a wallet). To make the ferroelectric LCD less sensitive to bending, the ferroelectric liquid crystal (FLC) is fixed to a side-chain of the polymer used to create the LCD film (e.g., as taught in Japanese Patent Document No. 63-318526) or where the FLC is dispersed in the polymer film (e.g., as taught in U.S. Pat. No. 5,638,194).

Other implementations can include different display elements such as suspended particle displays or field emission displays. These display elements, however, require a power source to display images.

A filter layer can add color to an otherwise monochromatic LCD display. The filter layer may include color filters for red, green, and blue. A pixel either blocks color filtered light or permits the color to illuminate a pixel. Though each pixel only shows red, green, or blue, the viewer spatially integrates the colors to perceive combinations of the above colors (e.g., purple).

In embodiments that store cash, the display can be configured as a dot matrix display. The display driving circuitry can use a multiplexed technique used in commercial passive displays to quickly refresh the display.

The microprocessor may control a driver circuit that develops the voltages appropriate to activate and deactivate the display element pixels. A power source on the card or an external power source (e.g., a card reader) can provide the power needed by the microprocessor and other stages. A polarity switch at the output of the driver circuit selects whether the row or column electrode is to receive the positive polarity. A row/column selector switch determines which specific row/column pair receives the voltages produced by the polarity switch and driver circuit. The microprocessor controls the driver circuit, polarity switch, and row/column selector switch.

The assembled chip card and display element may safely undergo flexing of the type and magnitude experienced during normal use, handling, and storage (e.g., storage in a pocket, wallet, or purse)" by which is meant flexing through the following five tests with the card and display element still functioning and with it not showing any cracked part (see ISO 7816-1, hereby incorporated by reference):

In performed the above tests, corret functioning of the card should be ascertained every 125 bends or toesions.

The display the card is flexed into a curved shape, but once the card is allowedd to assume its original shape the display will again function correctly. conributing to this flexibility are the polymer substates (top and bottom layers) and the z-axis conductor for making connection between the printed circuit board and the display. The z-axis conductor can withstand the variable compression that flexing produces.

What is claimed is:

1. A method of delivering advertisement information from a source of advertisement information to a chip card for display on a display element of the chip card, comprising:

establishing a communication path between the source and the chip card;

transmitting the advertisement information from the source to the chip card via the communication path; and displaying the transmitted advertisement information on the chip card display element, wherein the display element is capable of being flexed, without permanent damage, into the shape of the card supporting the display element when the card undergoes the following bending steps:

(1) with the contacts facing up, bending the long side of the chip card through a deflection of 1 cm at a rate of 30 bendings per minute, for a total of 250 bendings;

(2) with the contacts facing down, bending the long side of the chip card through a deflection of 1 cm at a rate of 30 bendings per minute, for a total of 250 bendings;

(3) with the contacts facing up, bending the short side of the chip card through a deflection of 0.5 cm at a rate of 30 bendings per minute, for a total of 250 bendings;

(4) with the contacts facing down, bending the short side of the chip card through a deflection of 0.5 cm at a rate of 30 bendings per minute, for a total of 250 bendings;

(5) placing the chip card in a machine that applies torsion to its short sides, the maximum displacement being 5 degrees (plus or minus 1 degree) in alternative directions at a rate of 30 torsions per minute for a total of 1,000 torsions.

2. The method of claim 1, wherein the advertisement information comprises at least one of the following: an image and an image sequence.

3. The method of claim 1, further comprising storing the advertisement information in chip card memory.

4. The method of claim 1, wherein chip card memory stores advertisement information representing a plurality of advertisements.

5. The method of claim 4, further comprising selecting at least one advertisement for display from the plurality of advertisements stored in chip card memory.

6. The method of claim 1, wherein the advertisement information comprises an image of a coupon.

7. The method of claim 1, wherein the advertisement information comprises an image of a store map.

8. The method of claim 1, wherein the advertisement information describes a product.

9. The method of claim 1, wherein the display element comprises a flexible, color display element.

10. The method of claim 1, further comprising transmitting audio data to the chip card via the communication path.

11. The method of claim 1, further comprising transmitting an internet address to the chip card via the communication path.

12. The method of claim 1, further comprising, prior to transmitting the advertisement information, selecting advertisement information for transmission.

13. The method of claim 1, further comprising retrieving data stored in chip card memory.

14. The method of claim 13, wherein the retrieved data comprises at least one of the following: a chip card identification code, chip card usage data, demographic data, and sound data.

15. The method of claim 13, further comprising selecting advertisement information for transmission based on the data retrieved from chip card memory.

16. The method of claim 1, wherein the communication path comprises a path via networked computers.

17. The method of claim 1, further comprising blocking transmission of the advertisement information to the chip card at a point in the communication path.

18. A method of electronic ticketing using a chip card having memory and a display element, comprising:

transmitting ticketing information to the chip card; and displaying the ticket information on the chip card display elements;

wherein the display element is capable of being flexed, without permanent damage, into te shape of the card supporting the display element when the card undergoes the following bending steps:

(1) with the contacts facing up, bending the long side of the chip card through a deflection of 1 cm at a rate of 30 bendinas per minute, for a total of 250 bendings;

(2) with the contacts facing down, bending the long side of the chip card through a deflection of 1 cm a rate of 30 bendincs per minute, for a total of 250 bendings;

(3) with the contacts facing up, bending the short side of the chip card through a deflection of 0.5 cm at a rate of 30 bendings per minute, for a total of 250 bendings;

(4) with the contacts facing down, bending the short side of the chip card through deflection of 0.5 cm at a rate of 30 bending per minute, for a total of 250 bendings;

(5) placing the chip card in a machine that applies torsion to its short sides, the maximum displacement being 5 degrees (plus or minus 1 degree) in alternative directions at a rate 30 torsions per minute for a total of 1,000 torsions.

19. The method of claim 18, further comprising retrieving data from the chip card to authorize admission.

20. The method of claim 18, wherein ticketing information comprises at least one of the following: a seat assignment, a date, and a map.

* * * * *